United States Patent
Komatsu et al.

(10) Patent No.: US 6,876,516 B2
(45) Date of Patent: Apr. 5, 2005

(54) DISK DRIVE HAVING A REINFORCING ARRANGEMENT AGAINST AN EXTERNAL STRESS APPLIED THERETO

(75) Inventors: Hisateru Komatsu, Tendo (JP); Makoto Takahashi, Obanazawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 193 days.

(21) Appl. No.: 10/244,119

(22) Filed: Sep. 13, 2002

(65) Prior Publication Data

US 2003/0053249 A1 Mar. 20, 2003

(30) Foreign Application Priority Data

Sep. 17, 2001 (JP) ........................................ 2001-281206

(51) Int. Cl.$^7$ ............................ G11B 5/48; G11B 33/02; G11B 33/14
(52) U.S. Cl. ................................ 360/99.01; 360/99.02; 360/267.5; 360/97.04
(58) Field of Search ........................... 360/97.01, 97.02, 360/97.03, 98.01, 99.06, 266, 244.2, 97.04, 99.01, 99.02, 267.5

(56) References Cited

U.S. PATENT DOCUMENTS

| | | | | |
|---|---|---|---|---|
| 5,552,948 A | * | 9/1996 | Yokota et al. | ........... 360/246.3 |
| 5,583,716 A | * | 12/1996 | Akiba et al. | ............. 360/99.01 |
| 5,875,068 A | * | 2/1999 | Sawada | ................... 360/99.01 |
| 6,031,686 A | * | 2/2000 | Konno et al. | ............ 360/99.01 |
| 6,151,190 A | * | 11/2000 | Yamamoto et al. | ....... 360/99.06 |
| 6,385,156 B1 | * | 5/2002 | Furukawa et al. | ........... 369/100 |
| 6,452,741 B1 | * | 9/2002 | Mukaijima et al. | ...... 360/99.06 |
| 2003/0053248 A1 | * | 3/2003 | Komatsu et al. | ......... 360/99.06 |

* cited by examiner

Primary Examiner—Jefferson Evans
(74) Attorney, Agent, or Firm—Frishauf, Holtz, Goodman & Chick, P.C.

(57) ABSTRACT

In a disk drive for using a disk cartridge including a magnetic disk, a reinforcing arrangement is coupled to a main frame, a main board fixed to the main frame, and a head assembly which is movable in a radial direction of the magnetic disk. The reinforcing arrangement inhibits internal collision in the head assembly even when the disk drive is subjected to a mechanical shock. The main board and the head assembly are placed between the main frame and a cover which is opposite to the main frame.

4 Claims, 9 Drawing Sheets

DISK DRIVE HAVING A REINFORCING ARRANGEMENT AGAINST AN EXTERNAL STRESS APPLIED THERETO

BACKGROUND OF THE INVENTION

This invention relates to a thin-profile disk drive for use in recording and reproducing information to and from a flexible disk (FD) as a magnetic recording medium.

As well known, a flexible disk drive (FDD) is for recording and reproducing information to and from a flexible magnetic disk as a magnetic recording medium. The magnetic disk is contained in a plastic case. A combination of the magnetic disk and the plastic case is generally called a disk cartridge.

Such a disk drive comprises a main frame and a cover attached opposite to the main frame. In order to recording or reproducing the information, the disk cartridge is set or inserted between the main frame and the cover and held on a disk table provided in the disk drive. The disk table has a rotation shaft in the manner such that the center of the magnetic disk is coincident with the rotation shaft of the disk table.

The disk table is supported on a main frame is driven and rotated by a spindle motor which is mounted on a motor frame. The spindle motor is for rotating the magnetic disk included in the disk cartridge. The disk drive further comprises a pair of magnetic heads, i.e., upper and lower magnetic heads, for reading/writing data to/from the magnetic disk in the disk cartridge. The upper magnetic head is supported by a head assembly at its end. The head assembly is located on a rear side of the disk drive and comprises upper and lower head supporting members supporting the upper and the lower magnetic heads, respectively. The head assembly is disposed above a principal surface of the main frame and spaced from the main frame. The head assembly supports the upper magnetic head at its end so that the upper magnetic head is movable in a predetermined radial direction with respect to the magnetic disk.

The disk drive is often subjected to an external stress applied between the main frame and the cover. For example, when the disk drive is strongly held by a user's hand before the disk cartridge is inserted therein, at least one of the main frame and the cover is bent. As a result, it is assumed that the disk drive is deformed. The deformation of the disk drive or other components due to the external stress causes a displacement of the head assembly. When the disk cartridge is inserted into the disk drive in this condition, the magnetic heads may be damaged by the disk cartridge.

SUMMARY OF THE INVENTION

It is therefore an object of this invention to provide a disk drive capable of preventing a magnetic head from being damaged due to collision.

Other objects of the present invention will become clear as the description proceeds.

According to this invention, there is provided a disk drive for using a disk cartridge including a magnetic disk. The disk drive comprises a main frame, a cover opposite to the main frame, a main board placed between the main frame and the cover and fixed to the main frame, a head assembly placed between the main frame and the cover and movable in a radial direction of the magnetic disk, and a reinforcing arrangement coupled to the head assembly for inhibiting internal collision in the head assembly even when the disk drive is subjected to a mechanical shock.

DESCRIPTION OF THE PREFERRED EMBODIMENT

In order to facilitate an understanding of this invention, an existing flexible disk drive (FDD) will at first be described with reference to the drawing.

Figure 1:
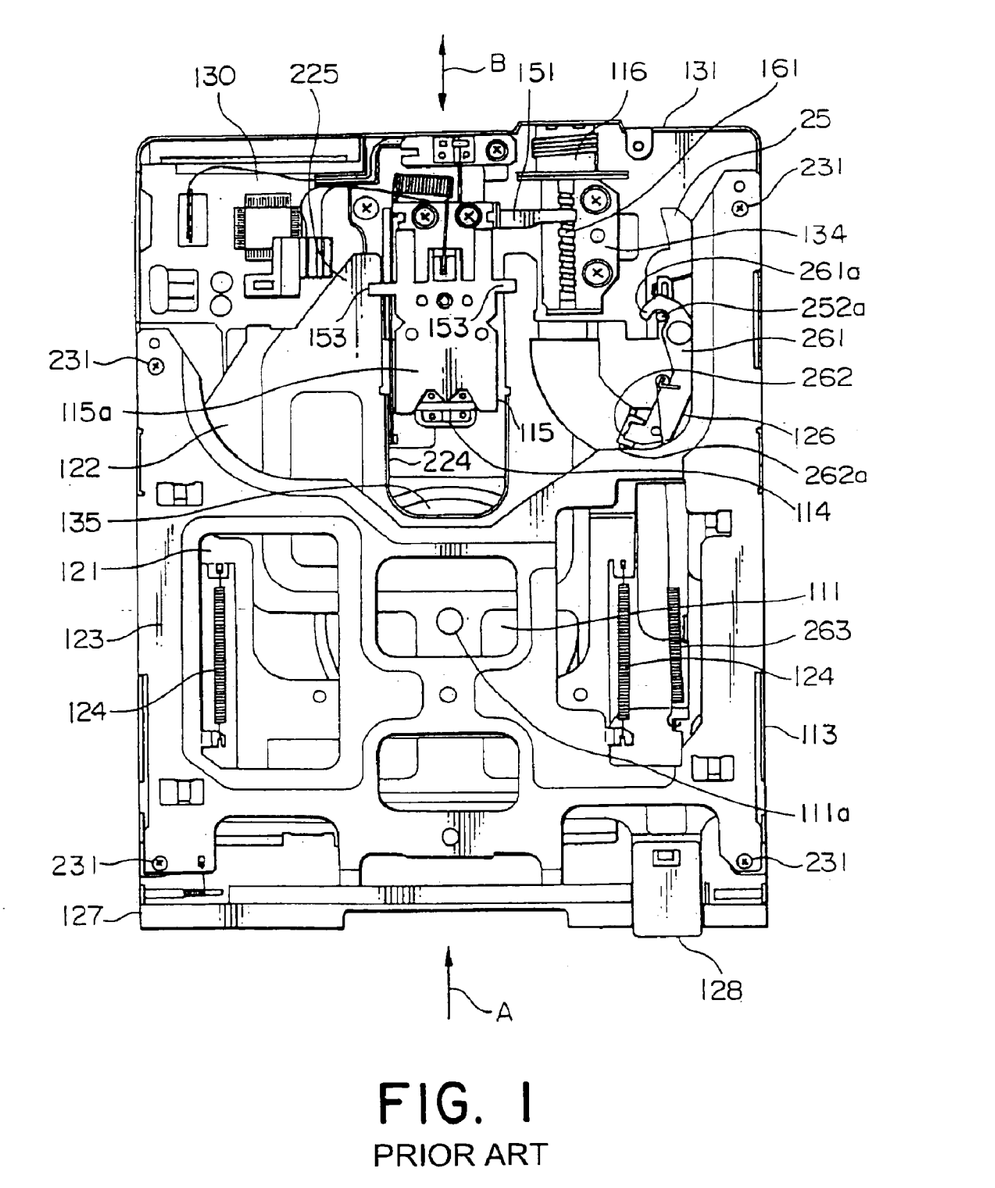
FIG. 1 is a plan view of an existing disk drive.
Figure 2:
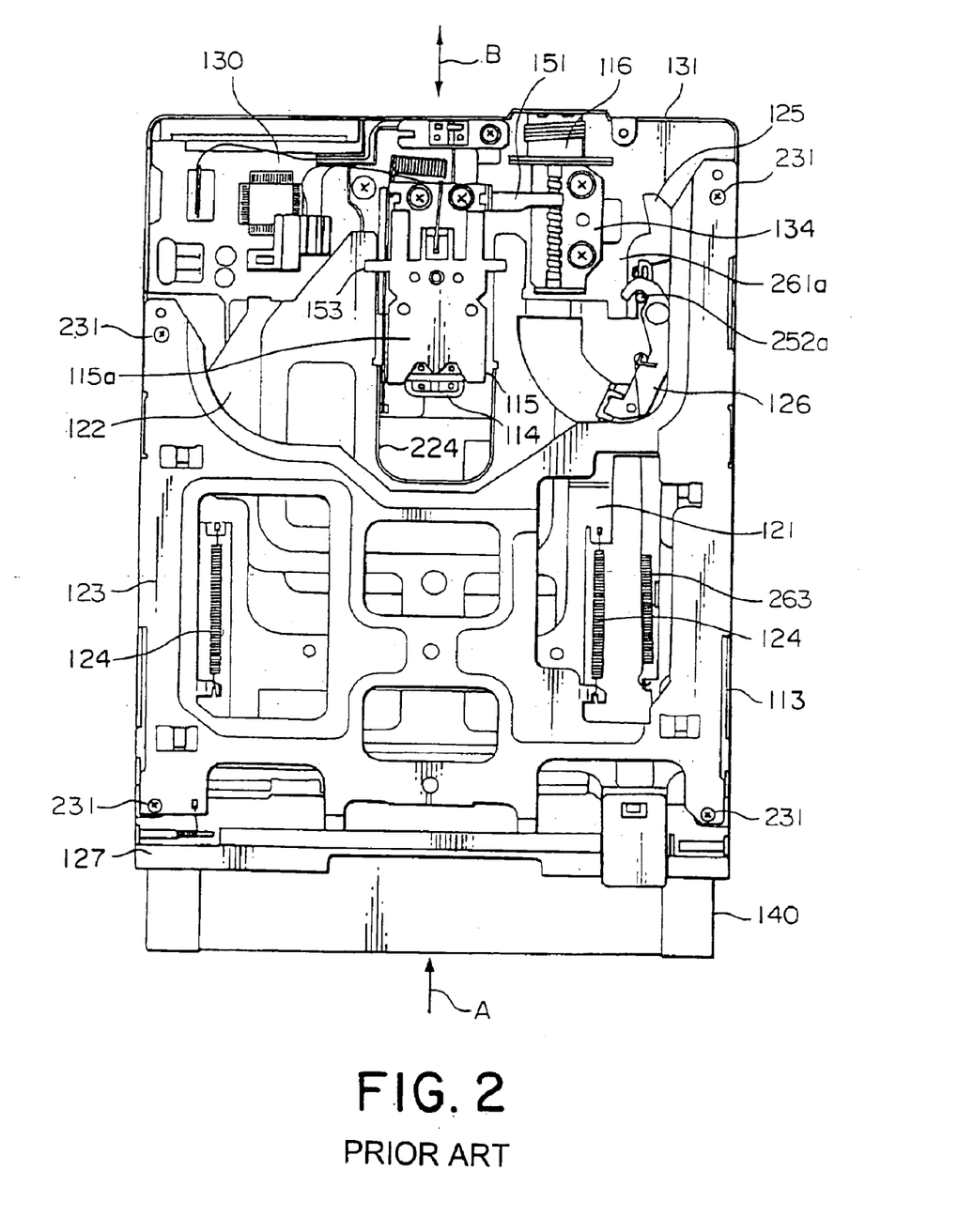
FIG. 2 is a plan view of the disk drive illustrated in FIG. 1 when a disk cartridge is being inserted.
Figure 3:
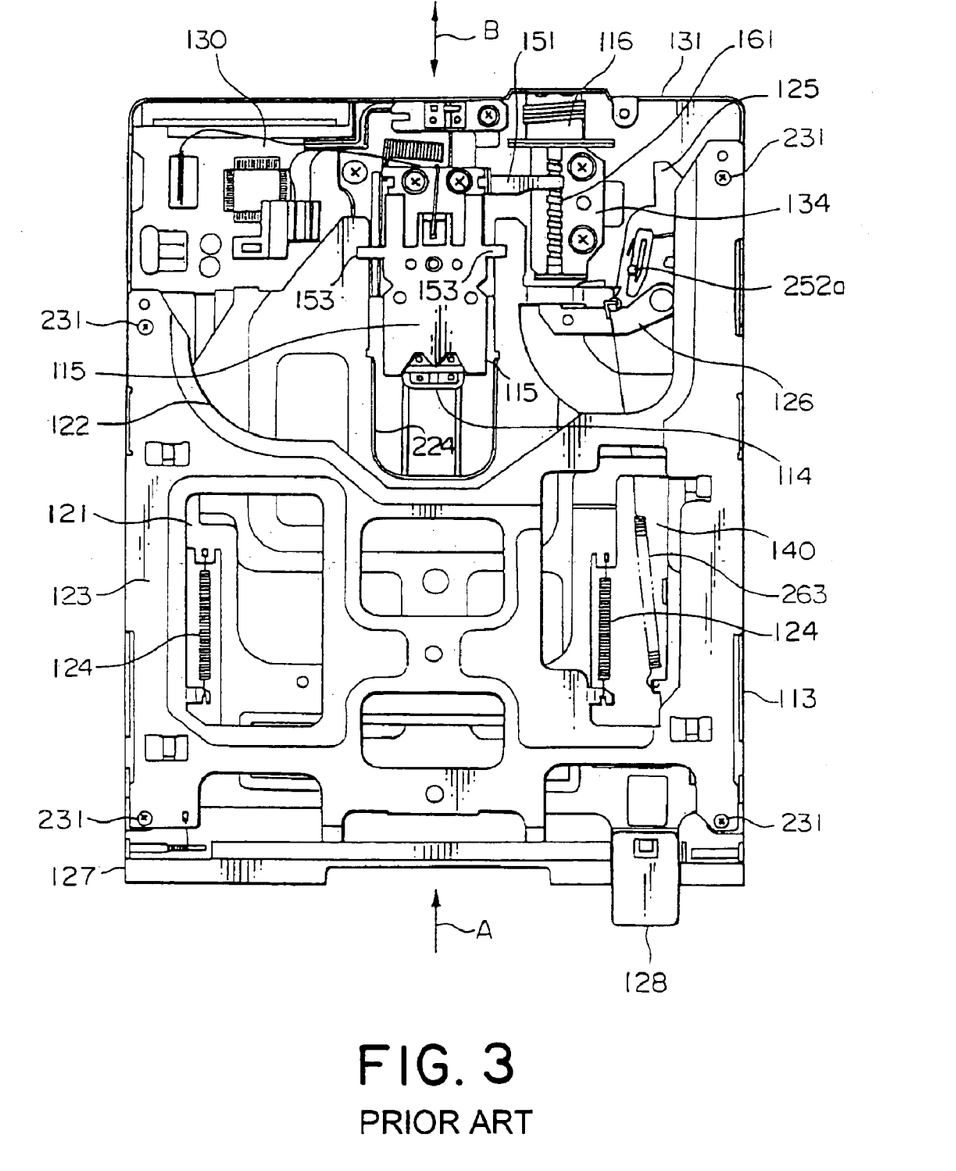
FIG. 3 is a plan view of the disk drive illustrated in FIG. 1 when the disk cartridge is completely inserted.

Referring to FIGS. 1 through 3, the existing flexible disk drive of a 3.5-inch type is adapted to drive a flexible magnetic disk of a 3.5-inch type. In FIG. 1, a disk cartridge 140 illustrated in FIG. 2 is not inserted. In FIG. 2, the disk cartridge 140 is being inserted. In FIG. 3, the disk cartridge 140 is completely inserted. In each of FIGS. 1 through 3, an upper cover (not shown) is removed.

The disk cartridge 140 contains a flexible magnetic disk as a magnetic recording medium. The disk cartridge 140 is inserted into the disk drive in an inserting direction depicted by an arrow A in FIGS. 1 through 3. The disk cartridge 140 inserted into the disk drive is held on a disk table 111 in the manner such that the center of the magnetic disk is coincident with a rotation shaft 111a of the disk table 111. The disk table 111 is rotatably supported on an upper surface of a motor frame (not shown) attached to a main frame 113. The rotation shaft 111a has an axial direction (perpendicular to a drawing sheet) parallel to a thickness direction of the main frame 113.

The disk table 111 is driven and rotated by a spindle motor 135 disposed on the motor frame so that the magnetic disk in the disk cartridge 140 is rotated. A main board 130 with a number of electronic components mounted thereon is attached to the main frame 113 and the motor frame.

The disk drive comprises a pair of magnetic heads, i.e., upper and lower magnetic heads for reading/writing data to/from the magnetic disk in the disk cartridge 140. In the figures, only the upper magnetic head 114 is illustrated.

The upper magnetic head 114 is supported by a head assembly 115 at its end. The head assembly 115 is located on a rear side of the disk drive. The head assembly 115 comprises an upper head supporting member 115a supporting the upper magnetic head 114 and a lower head supporting member (not shown) supporting the lower magnetic head.

The head assembly 115 is disposed above a principal surface of the main frame 113 and spaced from the main frame 113, as will later be described. The head assembly 115 supports the upper magnetic head 114 at its end so that the upper magnetic head 114 is movable in a predetermined radial direction (depicted by an arrow B in FIGS. 1 through 3) with respect to the magnetic disk.

The main frame 113 has a rear wall 131 with a stepping motor 116 fixed thereto. The stepping motor 116 serves to linearly drive the head assembly 115 in the predetermined radial direction B. More in detail, the stepping motor 116 has a rotation shaft (driving shaft) 161 extending in parallel to the predetermined radial direction B. The rotation shaft 161 is provided with a male thread or external thread. The rotation shaft 161 has a forward end inserted through a hole formed in a support member 131 attached to the principal surface of the main frame 113. The rotation shaft 161 is limited in position to extend in parallel to the predetermined radial direction B and the forward end of the rotation shaft 161 is rotatably held.

On the other hand, the head assembly 115 has an arm 151 extending from the lower head supporting member to the rotation shaft 161. The arm 151 has a forward end engaged with a root of the male thread formed on an outer peripheral surface of the rotation shaft 161. Therefore, when the rotation shaft 161 is rotated, the forward end of the arm 151 is moved along the root of the male thread of the rotation shaft 161 so that the head assembly 115 itself is moved in the predetermined radial direction B. Thus, the stepping motor 116 serves as a driving arrangement for linearly moving the head assembly 115 in the predetermined radial direction B.

The rotation shaft 161 is disposed on one side of the head assembly 115. Therefore, the one side of the head assembly 115 is movably supported by the rotation shaft 161 and spaced from the principal surface of the main frame 113.

However, by the rotation shaft 161 alone, it is impossible to support a whole of the head assembly 115 with a space kept from the principal surface of the main frame 113. Therefore, the head assembly 115 is supported and guided by a guide bar (not shown) on the other side of the head assembly 115.

Specifically, the guide bar is arranged on the other side of the head assembly 115 opposite to the rotation shaft 161. The guide bar extends in parallel to the predetermined radial direction B and has one end and the other end fixed to the principal surface of the main frame 113 as will later be described. The guide bar serves to guide the head assembly 115 in the predetermined radial direction B. Thus, the head assembly 115 as a whole is supported with a space kept from the principal surface of the main frame 113.

A flexible printed circuit (FPC) (not shown) extends from the head assembly 115 towards the guide bar. The FPC is electrically connected to the main board 130 attached to the principal surface of the main frame 113.

The lower head supporting member of the head assembly 115 also serves as a supporting frame supporting the head assembly 115 so that the head assembly 115 is slidable along the guide bar. The lower head supporting member has a protruding portion (not shown) protruding towards the guide bar. The guide bar is slidably fitted into the protruding portion.

The disk drive further comprises an elect plate 121 and a disk holder 122. Each of the main frame 113, the elect plate 121, and the disk holder 122 is formed by punching, pressing, and bending a metal plate.

The elect plate 121 is mounted on the main frame 113 to be slidable in the inserting direction A and an ejecting direction opposite thereto, i.e., to be slidable in a back-and-forth direction.

Figure 4:
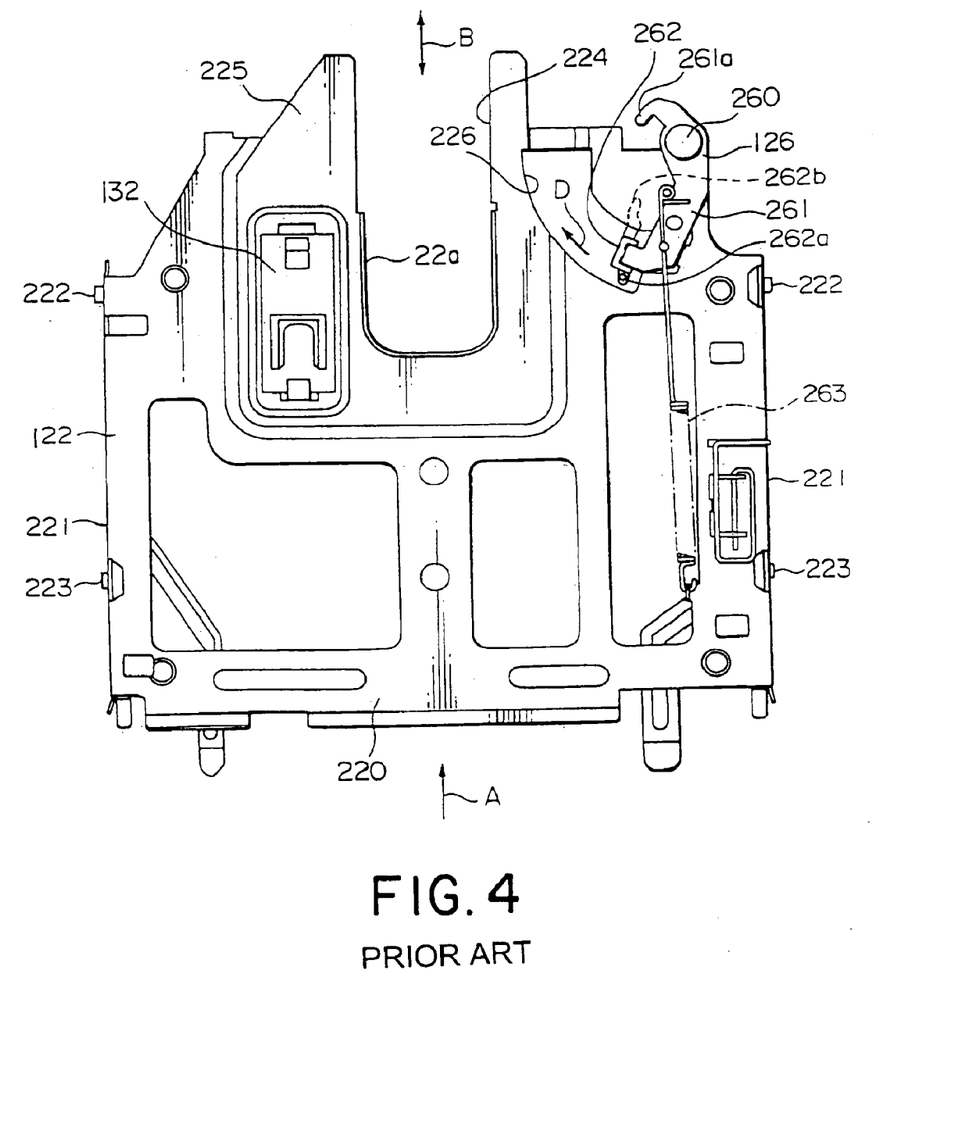
FIG. 4 is a plan view showing a disk holder assembly used in the disk drive illustrated in FIG. 1.

The disk holder 122 is disposed under the elect plate 121. As illustrated in FIG. 4, the disk holder 122 has a principal surface 220 and a pair of side walls 221 formed on opposite sides of the principal surface 220 and faced to each other. The side walls 221 have a pair of pins 222 and 223, respectively.

The disk holder 122 has a generally rectangular opening 224 formed in a center area inward in the inserting direction A. Specifically, the opening 224 is formed at a position corresponding to the upper head supporting member 115a and extends in the predetermined radial direction B. The opening 224 is surrounded by a generally U-shaped ridge 225 rising upward from the principal surface 220.

On the other hand, the head assembly 115 comprises a pair of side arms 153 (see FIGS. 1 through 3) extending in a lateral direction. The side arms 153 are located on or above the ridge 225. In the state where the disk cartridge 140 is ejected from the disk holder 122, the side arms 153 are engaged with the ridge 225 so that the upper magnetic head 114 and the lower magnetic head are separated from each other. Furthermore, the disk holder 122 has another opening 226 formed at a right-hand side of the opening 224 inward in the insertion direction A. The opening 226 has a shape such that the rotation of a lever part of an eject lever (which will later be described) 125 is allowed.

The principal surface of the main frame 113 is covered with a sub frame 123. The sub frame 123 has four corners fixed to the main frame 113 by screws 231. Between the sub frame 123 and the eject plate 121, eject springs 124 are bridged. On the main frame 113, the eject lever 125 is rotatably arranged in the vicinity of the head assembly 115.

Figure 5A:
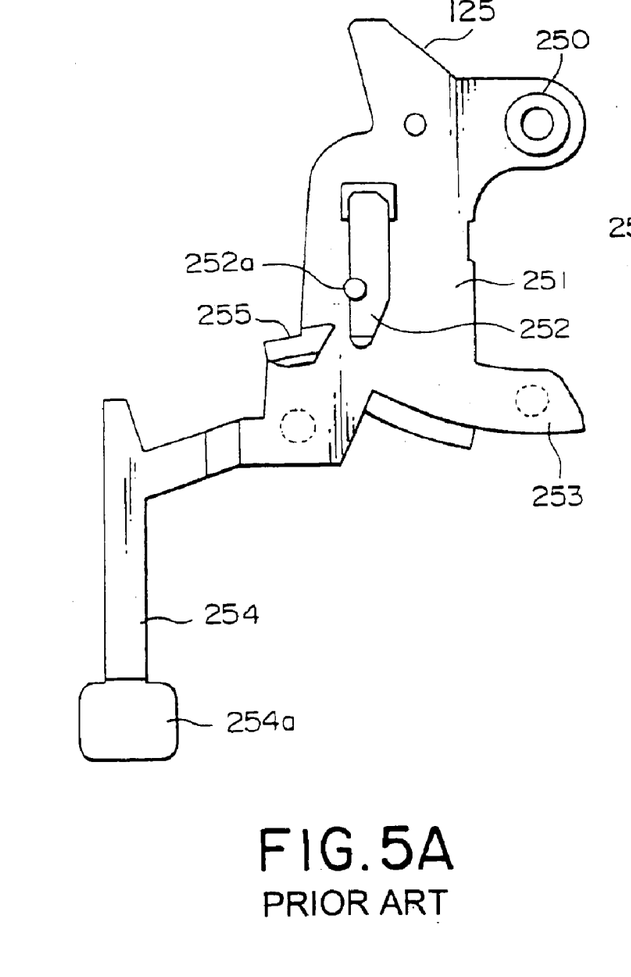
FIGS. 5A, 5B, and 5C are a plan view, a right side view, and a rear view of an eject lever used in the disk drive illustrated in FIG. 1.
Figure 5B:
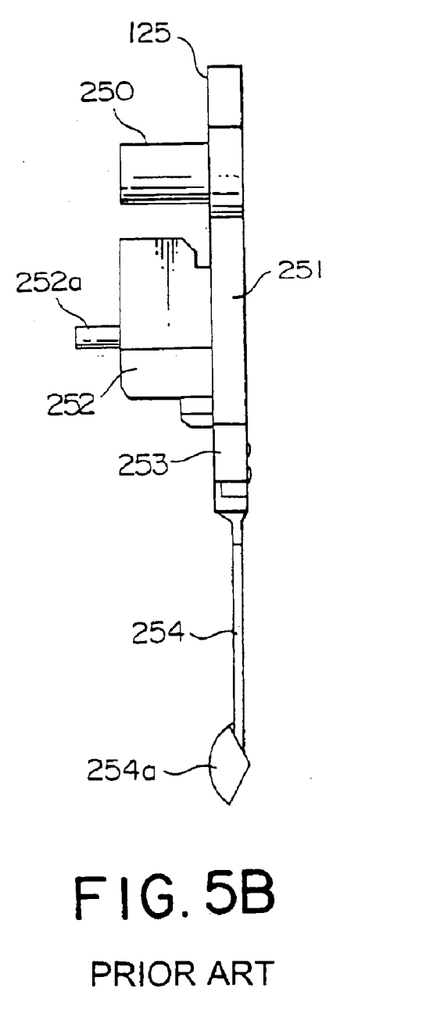
Figure 5C:
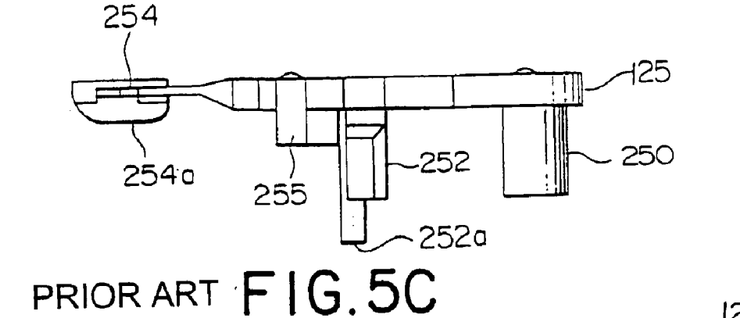

Referring to FIGS. 5A through 5C, the eject lever 125 will be described. The main frame 113 is provided with a rod pin (not shown) standing from the principal surface thereof and extending upward from a predetermined position on the right side and the rear side. The eject lever 125 comprises a cylindrical part 250 to receive the rod pin fitted thereto, an arm part (lever part) 251 extending from the cylindrical part 250 in a radial direction, a protruding part 252 formed on the arm part 251 and extending upward, and an arc-shaped locking part 253 extending from a free end of the arm part 251 in a circumferential direction.

The eject lever 125 is provided with an eject lever spring (not shown) attached around the cylindrical part 250. The eject lever spring urges the eject lever 125 in a counter-clockwise direction in the figure.

The protruding part 252 is engaged with a forward end of the disk cartridge 140 to control a sliding movement of the eject plate 121 in the back-and-forth direction.

The eject lever 125 has a tongue part 254 extending in parallel to the arm part 251 towards the spindle motor 116. The tongue part 254 has a forward end 254a expanding upward. The forward end 254a serves to prevent the disk cartridge 140 from colliding with the lower magnetic head when the disk cartridge 140 is inserted into the disk drive.

The protruding part 252 has a protrusion 252a protruding further upward to be engaged with a hook portion 261a of a disk shutter arm 126 which will later be described.

The eject lever 125 further has a stopper part 255. The stopper part 255 is adapted to be engaged with the disk shutter arm 126 (which will later be described) to prevent the disk shutter arm 126 from returning to its initial position when the disk cartridge 140 is completely received in the disk drive.

On a right upper corner of the disk holder 122, the disk shutter arm 126 is attached to be rotatable around an arm pin 260. The disk shutter arm 126 has an arm part (lever part) 261 extending from the right upper corner in the radial direction, and an arm bushing 262 formed at an end of the arm part 261 and extending downward.

The arm part 261 has the hook portion 261a engaged with the protrusion 252a. As illustrated in FIG. 4, the arm bushing 262 is loosely fitted to the opening 226.

The arm bushing 262 has an end portion 262a. The end portion 262a is engaged with a right upper edge of a shutter of the disk cartridge 140 to controllably open and close the shutter. The arm bushing 262 further has a protruding portion 262b. The protruding portion 262 is engaged with the stopper part 255 when the disk cartridge 140 is completely received in the disk drive.

The disk shutter arm 126 is urged by a shutter arm spring 263 in the counterclockwise direction.

Specifically, the shutter arm spring 263 is bridged between the arm part 261 and the disk holder 22. To the ridge 225, an upper magnetic head guard 132 is attached to protect the upper magnetic head 114 so that the disk cartridge 140 does not collide with the upper magnetic head 114 when it is inserted into the disk drive.

The disk holder 122 is provided with a reverse insertion preventing spring (not shown) attached to the right side of the principal surface 220 thereof. A combination of the disk holder 122, the disk shutter arm 126, the arm pin 260, the upper magnetic head guard 132, the reverse insertion preventing spring, and the disk shutter arm 126 forms a disk holder assembly.

The main frame 113 has a front end portion provided with a front panel 127 attached thereto. The front panel 127 has an opening (not shown) allowing passage of the disk cartridge 140 and a door (not shown) for closing the opening. The front panel 127 is provided with an eject button 128 protruding therefrom to be movable backward and forward. The eject button 128 is fitted to a protruding part (not shown) formed at a front end of the elect plate 121 to protrude forward.

With the above-mentioned structure, the hook portion 261a is engaged with the protrusion 252a as illustrated in FIG. 1 to limit the rotation of the eject lever 125 when the disk cartridge 140 is not inserted into the disk drive. Thus, the eject lever 125 is prevented from being rotated over a predetermined rotation angle unless the disk cartridge 140 is inserted into the disk drive.

Next, description will be made of an operation of inserting the disk cartridge 140 into the disk cartridge and an operation of ejecting the disk cartridge 140 inserted in the disk drive.

Before the disk cartridge 140 is inserted into the disk drive, the eject lever 125 and the disk shutter arm 126 are located at positions illustrated in FIGS. 1 and 5. Specifically, the protrusion 252a is engaged with the hook portion 261a. In this state, a stopper part 255 of the eject plate 121 is engaged with the locking part 253.

In this state, the pins 222 and 223 are located at upper positions in side walls 221 is located at an elevated position such that the disk cartridge 140 is acceptable. In this state, the side arms 153 are engaged with the ridge 225 and the upper magnetic head 114 is located at an upper position and separated from the lower magnetic head.

In this state, a user holds the disk cartridge 140 with its forward end in contact with the door of the front panel 127 and inserts the disk cartridge 140 in a normal state into the disk drive in the inserting direction A, as illustrated in FIG. 2. Then, as illustrated in FIG. 2, the shutter of the disk cartridge 140 is engaged with the end portion 262a. After this time instant (this position), the disk cartridge 140 is further pushed inward against the urging force of the shutter arm spring 263 attached to the disk shutter arm 126. Then, the arm bushing 262 rotates in the opening 226 in the clockwise direction depicted by an arrow D in FIG. 4. Following the rotation of the arm bushing 262, the shutter of the disk cartridge 140 slides against the urging force of the shutter arm spring 263. As a consequence, the opening 226 is gradually exposed.

Immediately before the shutter of the disk cartridge 140 is sufficiently opened by the disk shutter arm 126 and the disk cartridge 140 is completely received in the disk drive, the forward end of the disk cartridge 140 is engaged with the protruding part 252. At this time, the protrusion 252a is disengaged from the hook portion 261a. Therefore, the eject lever 125 is rotatable in the clockwise direction.

When the disk cartridge is further pushed inward in the disk drive, the eject lever 125 is rotated against the eject lever spring attached thereto. As a consequence, the locking part 253 is disengaged from the stopper part 212. Therefore, the eject plate 121 is slightly slides forward (reverse to the inserting direction A). This is because the eject plate 121 is urged forward by the eject spring 124.

On the other hand, the disk holder 122 is moved downward by the forward movement of the eject plate 121. This is because the pins 222 and 223 formed on the side walls 221 are inserted into the cam portions formed on side walls of the eject plate 121.

In the above-mentioned manner, the side arms 153 are disengaged from the ridge 225 and the upper head supporting member 115a is moved downward. As a consequence, the magnetic disk in the disk cartridge 140 is clamped by the upper magnetic head 114 formed at the end of the head assembly 115 and the lower magnetic head. At this time, the protruding portion 262b is engaged with the stopper part 255 so that the disk shutter arm 126 is prevented from returning to its initial position. Since the eject plate 121 slightly slides forward, the eject button 128 slightly protrudes forward from the front panel 127. This state is illustrated in FIG. 3. Thereafter, data can be read and written from and to the magnetic disk in the disk cartridge 140 by at least one of the upper magnetic head 114 and the lower magnetic head. Next, description will be made of the operation of ejecting the disk cartridge 140 received in the disk drive. In this case, the user presses the eject button 128 rearward in the inserting direction A. As a consequence, the eject plate 121 slides on the main frame 113 rearward in the inserting direction A. Simultaneously, the pins 222 and 223 move along the cam portions of the eject plate 121 so that the disk holder 122 is elevated. As a consequence, the side arms 153 are engaged with the ridge 225. The upper magnetic head 114 supported at the end of the head assembly 115 and the lower magnetic head are separated from the magnetic disk in the disk cartridge 140. When the eject button 128 is further pushed rearward in the inserting direction A, the disk holder 122 is located at a predetermined upper position and the eject lever 125 is rotated in the counterclockwise direction due to the urging force of the eject lever spring.

Simultaneously, the stopper part 255 is disengaged from the protruding portion 262b. Due to the urging force of the shutter arm spring 263, the disk shutter arm 126 is rotated in the counterclockwise direction reverse to the direction depicted by the arrow D in FIG. 4. As a consequence, the disk cartridge 140 received in the disk holder 122 is pushed out in the ejecting direction opposite to the inserting direction A so that the disk cartridge 140 is ejected from the disk drive. In this state, the locking part 253 is engaged with the stopper part 212 so that the eject plate 121 is prevented from moving towards the front panel 127.

A cover (not shown) is attached to the main frame 113 and assembling is completed. The disk drive is often subjected to an external stress. For example, when the disk drive is held by a user's hand before the disk cartridge 140 is inserted therein, the cover is pressed and bent so that the disk drive is deformed.

However, those components other than the disk holder 122 is subjected to the external stress to be deformed. Therefore, the deformation of the components due to the external stress is finally transmitted to the disk holder 122. In this event, when the disk cartridge 140 is inserted into the disk drive, the upper magnetic head 114 may be damaged.

Specifically, the upper magnetic head 114 lifted up by the disk holder 122 may be bent under the external stress to be drooped. In this state, the upper magnetic head 114 collides with the lower magnetic head. Therefore, the upper magnetic head 114 is damaged by mechanical shock.

Now, description will be made of an embodiment of this invention. Similar parts will not be described in detail.

Figure 6:
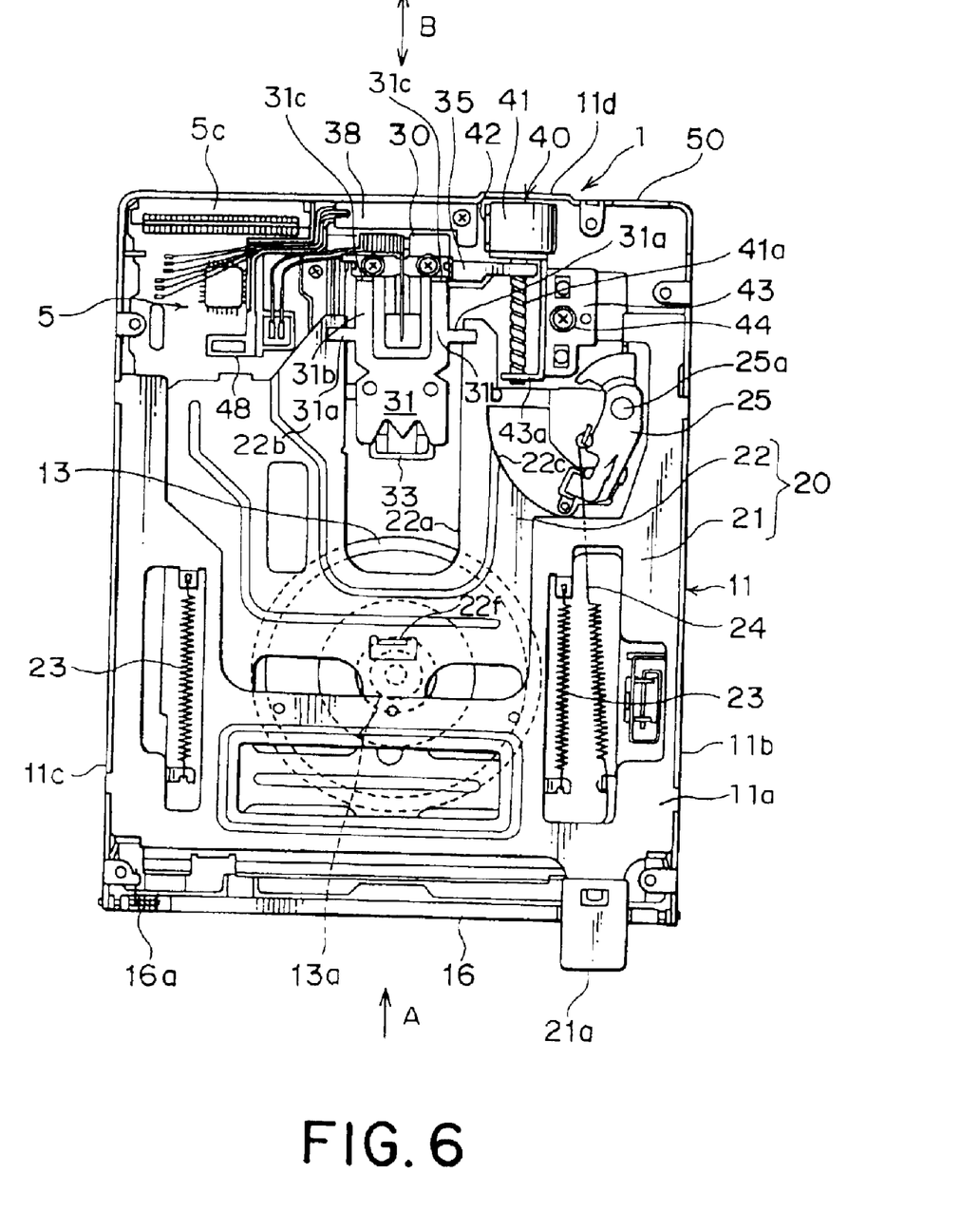
FIG. 6 is a plan view of a disk drive according to an embodiment of this invention in the state where a cover is removed.
Figure 7:
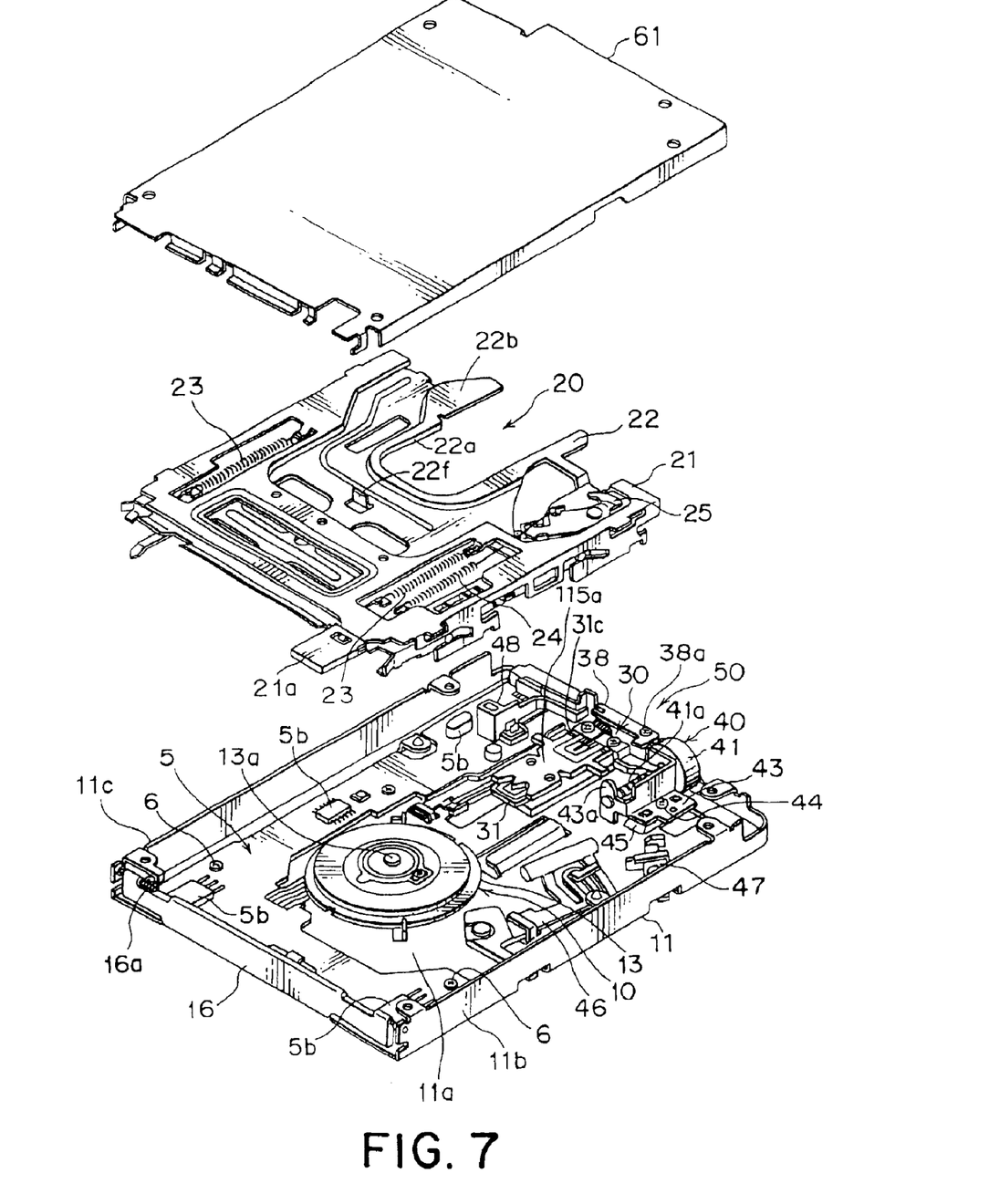
FIG. 7 is an exploded perspective view of the disk drive illustrated in FIG. 6.

Referring to FIGS. 6 and 7, a disk drive 1 according to the embodiment of this invention comprises a main frame 11 provided with a main board 5 and a spindle motor 10.

Herein, a lower side in FIG. 6 is assumed to be a front side. The main frame 11 has a flat base plate 11a, a pair of side plates 11b and 11c formed on opposite sides of the base plate 11a to extend from the front side to a rear side and standing up to be substantially perpendicular to the base plate 11a, and a rear plate 11d formed at a rear end of the base plate 11a and standing up to be substantially perpendicular to the base plate 11a.

The main frame 11 is provided with a front bezel 16 formed at its front end. The front bezel 16 is rotatable around an upper end thereof between a closed position and an opened position and is urged by a spring 16a to the closed position. The base plate 11a is provided with a disk receiving/ejecting mechanism 20, a head assembly 30 movable forward and rearward, and a stepping motor 40 for moving and positioning the head assembly 30.

The disk receiving/ejecting mechanism 20 comprises an eject plate 21 and a disk holder 22 disposed inside the eject plate 21. A disk cartridge (see FIG. 2) containing a flexible magnetic disk is received in a space between the disk holder 22 and the base plate 11a and on a turn table 13.

The eject plate 21 and the disk holder 22 are stacked to each other. The eject plate 21 is urged frontward (downward in FIG. 6) by a pair of coil springs 23 formed on opposite sides with respect to the disk holder 22. The disk holder 22 is provided with an eject lever 25 formed on one end face (right upper side in FIG. 6) thereof to be rotatable around a shaft 25a. Between the eject lever 25 and the disk holder 22, a coil spring 24 (corresponding to the shutter arm spring 263 in FIG. 2) is bridged.

When the disk cartridge is received, one end of the disk cartridge is brought into contact with one end of the eject lever 25 to rotate the eject lever 25 around the shaft 25a in a clockwise direction. At a predetermined position, the eject lever 25 is engaged with the disk holder 22 to be stopped.

On the other hand, when the disk cartridge is ejected, an eject button 21a is pushed rearward (upward in FIG. 6). Then, the eject lever 25 is disengaged from the disk holder 22 so that the eject lever 25 is rotated in a counterclockwise direction by a restoring force of the coil spring 24 to push out the disk cartridge.

As seen from FIG. 7, the disk drive 1 comprises a main portion 50, a disk receiving/ejecting mechanism 20 received in the main portion 50, and a cover 61 covering an upper side of the disk drive 1.

Figure 8:
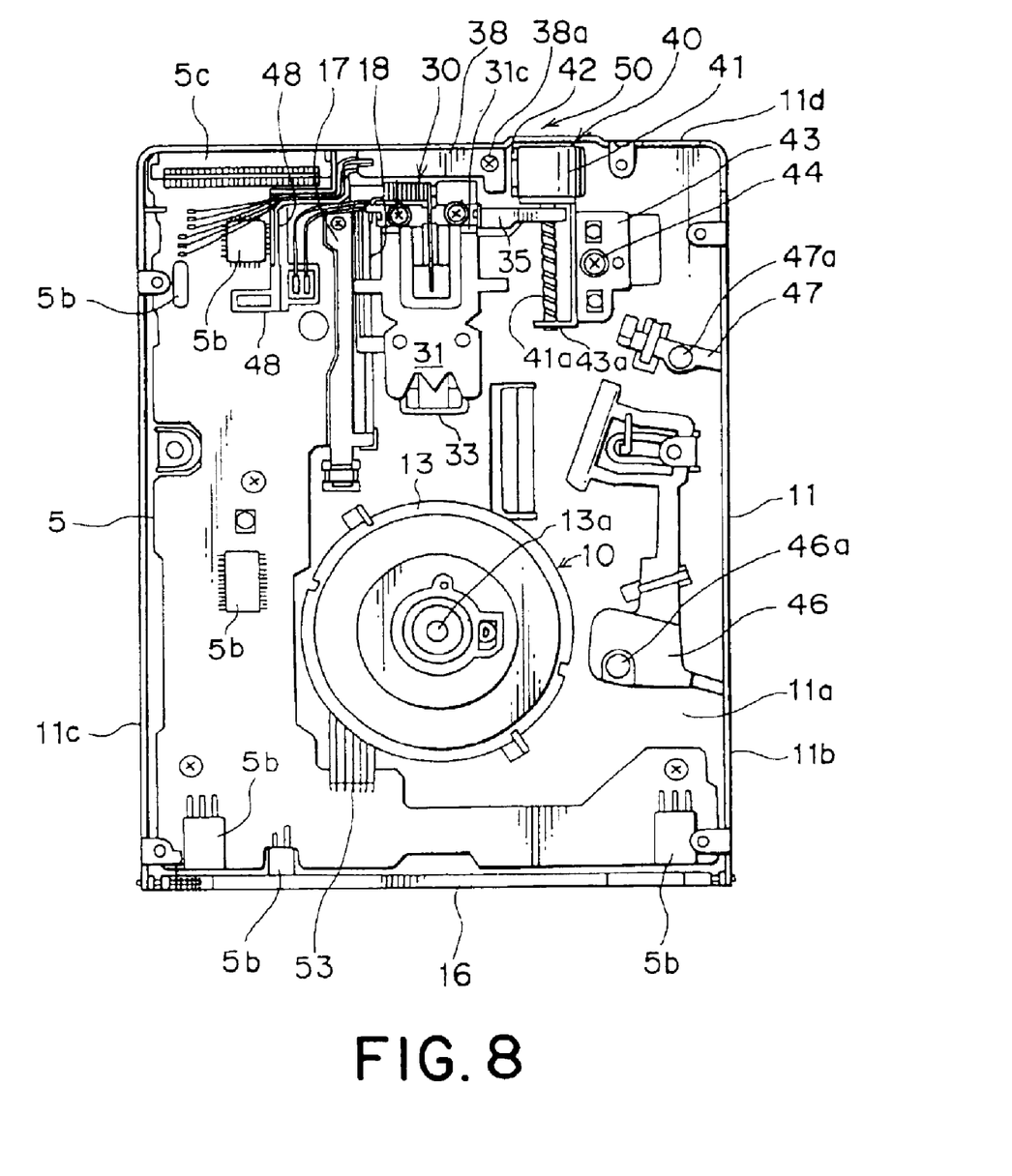
FIG. 8 is a plan view of a characteristic part of the disk drive illustrated in FIG. 6.
Figure 9:
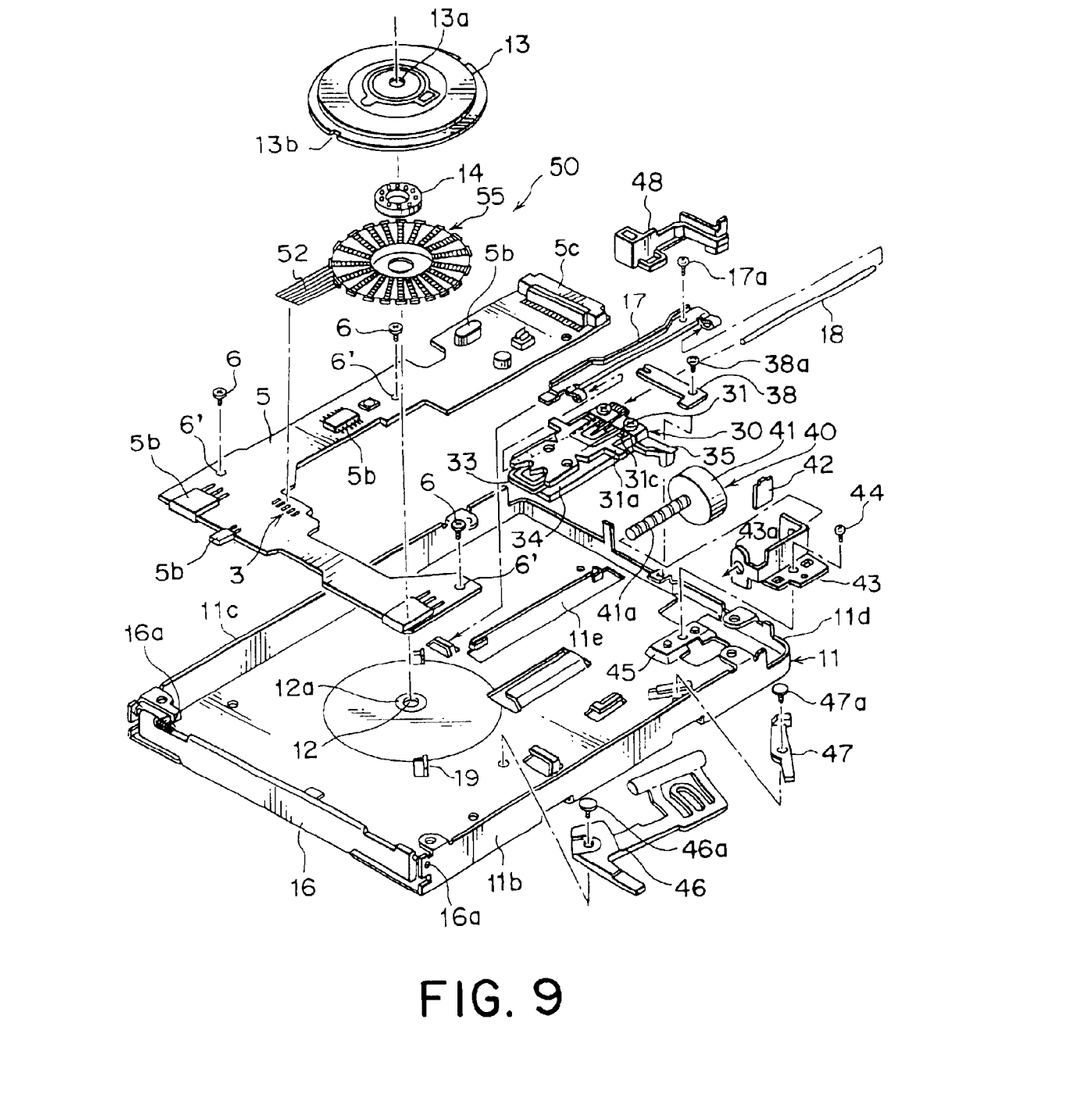
FIG. 9 is an exploded perspective view of the characteristic part of the disk drive illustrated in FIG. 8.

Referring to FIGS. 8 and 9, the main portion 50 comprises the main frame 11, the spindle motor 10 mounted on the base plate 11a, and the main board 5 mounted on the base plate 11a in an area around the spindle motor 10.

The main board 5 has a generally L shape. The main board 5 is connected to a flexible board 52 through a solder connecting portion 53. The main board 5 is provided with a plurality of electronic components 5b connected through a circuit pattern (not shown). The main board 5 is provided with a connector 5c mounted on its one end to carry out electric connection with an external circuit. Screw holes 6' is formed to fix the main board 5 to the base plate 11a.

The base plate 11a is provided with a head assembly 30 mounted on its one end. The head assembly 30 has one side inserted into a guide rail 18 and the other side engaged with an outer peripheral groove of a driving rod (screw rod) 41a connected to a motor body 41 of the stepping motor 40.

On the rear side of the head assembly 30, a board 38 for electrical connection is fastened to the main frame 11 by screw 38a. The stepping motor 40 is disposed on one side of the head assembly 30. The stepping motor 40 is positioned and fixed by fixing a support member 43 via a screw 44.

On one side of the stepping motor 40, a small-sized circuit board 42 is disposed to supply an electric current. The guide rail 18 is fixed by a fixing metal 17 to the base plate 11a together with the main board 5.

On the upper surface of the base plate 11a, a lifting lever 46 for lifting the disk cartridge in cooperation with the eject plate 21, the eject lever 25, and an unlock lever 47 for disengaging the disk holder 22 from the eject plate 21 are arranged.

Referring to FIG. 9, the main portion 50 is assembled in the following manner. The main board 5 is fixed by screws 6 to the base plate 11a. The fixing metal 17 is attached by a screw 17a to hold an inside of a rear end of the main board 5. The fixing metal 17 also serves to fix the guide rail 18.

Next, the flexible board 52 with a solenoid coil 55 is attached to the base plate 11a so that the center of the flexible board 52 is coincident with a through hole 12 provided with a bearing 12a. A bearing 14 is put on the center of the flexible board 52. A rotation shaft 13a of the turn table 13 is rotatably inserted into the through hole 12 through the bearing 12a. The turn table 13 is attached so that grooves 13b of the turn table 13 are coincident with cut-and-raised portions 19 formed on the base plate 11a. The turn table 13 is rotatable once it is attached. Unless the grooves 13b are matched in circumferential position with the cut-and-raised portions 19, the turn table 13 is inhibited from being released upward.

As seen in a vertical section, the head assembly 30 has a generally U shape and comprises an upper head supporting member 31 and a lower head supporting member 34 faced to the upper head supporting member 31 (see FIG. 9). An upper magnetic head (magnetic head element) 33 is arranged inside the upper head supporting member 31. A lower magnetic head (magnetic head element) is arranged inside the lower head supporting member 34, although not shown in the figure.

On one side of the head assembly 30, the stepping motor 40 is disposed. The stepping motor 40 has the driving rod 41a protruding from its one end. The driving rod 41a has an outer peripheral groove 41b engaged with one end of an arm 35 of the head assembly 30. The stepping motor 40 is held by fixing the support member 43 by the screw 44 to a protruding portion 45 of the base plate 11a.

On the main board 5 exposed on the left side of the head assembly 30, a standing member 48 made of a plastic material and having a S shape as seen in a plan view is formed. The standing member 48 serves as a guide for a signaling flexible cable connected to the head assembly 30. A supporting part 43a of the support member 43 and the standing member 48 are substantially equal in height and stand up towards the cover 61.

The disk holder 22 has a generally rectangular opening 22a formed in a center area inward in an inserting direction A along which the disk cartridge is inserted. Specifically, the opening 22a is formed at a position corresponding to the upper head supporting member 31 and extends in a predetermined radial direction B. The opening 22a is surrounded by a generally U-shaped ridge 22b rising upward from the principal surface of the disk holder 22.

The disk holder 22 is provided with a cut-and-raised part 22f formed frontward from the opening 22a and rising from the principal surface of the disk holder 22.

Each of the standing member 48, the supporting part 43a, and the cut-and-raised part 22f serves to maintain mechanical strength against compression in the vertical direction and serves as a reinforcing part resisting against deformation of the disk drive 1.

The supporting part 43a is located rearward in the inserting direction A and opposite to one side of the head assembly 30. The standing member 48 is located rearward in the inserting direction A and opposite to the other side of the head assembly 30.

On the other hand, the upper head supporting member 31 comprises a pair of side arms 31a extending in a lateral direction and a pair of upper arms 31b connected to the side arms 31a, respectively. The side arms 31a are located on or above the ridge 22b.

In the state where the disk cartridge is ejected from the disk holder 22, the side arms 31a are engaged with the ridge 22b so that the upper magnetic head 33 and the lower magnetic head are separated from each other. Furthermore, the disk holder 22 has another opening 22c formed at a right-hand side of the opening 22a inward in the inserting direction A. The opening 22a has a shape such that the rotation of a lever part of the eject lever 25.

Each of the upper arms 31b is provided with a butting part 31c formed on its end face in the inserting direction A and faced to an inner surface of the cover 61. The butting parts 31c serve to inhibit a drooping phenomenon of the upper magnetic head 33. Specifically, when the upper magnetic head 33 is subjected to a mechanical shock in its center area, the butting parts 31c of the upper head supporting member 31 are brought into contact with the inner surface of the cover 61. In this event, an end portion of the upper magnetic head 33 is rotated upward. Thus, the upper magnetic head 33 is prevented from being bent or drooped.

The upper magnetic head 33 is not drooped below the eject plate 21. Therefore, a space is kept between the upper magnetic head 33 and the lower magnetic head to inhibit collision therebetween upon occurrence of a mechanical shock. Thus, the upper magnetic head 33 is prevented from being damaged or broken.

The lifting lever 46 for lifting the disk cartridge in cooperation with the eject plate 21 upon ejecting the disk cartridge is rotatably attached to the base plate 11a by a pin 46a. The unlock lever 47 for releasing the engagement between the disk holder and the eject plate 21 in the back-and-forth direction is rotatably attached to the base plate 11a by a pin 47a. The main portion 50 illustrated in FIG. 8 is assembled in the manner illustrated in FIG. 9.

Furthermore, the disk receiving/ejecting mechanism 20 is received in the main portion 50 as illustrated in FIG. 7. Then, the structure illustrated in FIG. 6 is obtained. Furthermore, the cover 61 illustrated in FIG. 7 is attached and assembling of the disk drive 1 is completed.

The disk drive 1 thus completed may be subjected to an external stress. For example, when the disk drive 1 is held by a user's hand before the disk cartridge is inserted therein, the cover 61 is pressed and bent so that the disk drive 1 is deformed.

In this event, a combination of or each of the butting parts 31c, the standing member 48, the supporting part 43a, and the cut-and-raised part 22f serves as a reinforcing arrangement which is for resisting the deformation of the disk drive 1 to protect the head assembly 30. Therefore, internal collision in the head assembly 30 is inhibited even when the disk drive 1 is subjected to a mechanical shock.

Specifically, the upper magnetic head 33 and the disk holder 22 are simultaneously deformed by the same amount when subjected to the external stress. Therefore, the upper magnetic head 33 located in the opening 22a does not project beyond the ridge 22b so that the upper magnetic head 33 is not damaged or broken.

As described above, in the disk drive according to this invention, the disk holder 22 lifting the upper magnetic head 33 is provided with the cut-and-raised part 22f as a countermeasure against the external stress. In the normal condition, the upper magnetic head 33 is accommodated in the opening 22a. The upper magnetic head 33 and the disk holder 22 are simultaneously deformed by the same amount when subjected to the external stress. Therefore, the upper magnetic head 33 located inside the ridge 22b does not project beyond the ridge 22b so that the upper magnetic head 33 is prevented from being damaged.

As described above, the butting part 31c is formed, as a countermeasure against the external stress, at the end face of each of the upper arms 31a of the upper head supporting member 31 supporting the upper magnetic head 33. With this structure, the drooping phenomenon of the upper magnetic head 33 can be inhibited.

Specifically, when the upper magnetic head 33 is subjected to a mechanical shock in its center area, the butting parts 31c of the upper head supporting member 31 are brought into contact with the inner surface of the cover 61 to inhibit the upper magnetic head 33 from being bent or drooped. The upper magnetic head 33 is not drooped below the eject plate 21. Therefore, collision between the upper magnetic head 33 and the lower magnetic head is inhibited upon occurrence of a mechanical shock. Thus, the upper magnetic head 33 is prevented from being damaged or broken.

What is claimed is:

1. A disk drive for a disk cartridge which includes a magnetic disk, said disk drive comprising:
   (i) a main frame;
   (ii) a cover opposite to said main frame;
   (iii) a main board placed between said main frame and said cover and fixed to said main frame;

(iv) a head assembly placed between said main frame and said cover and movable in a radial direction of said magnetic disk, wherein said head assembly comprises:
- an upper head supporting member which is connected to said main frame and adjacent to said cover, and which includes an upper arm;
- an upper magnetic head supported by said upper head supporting member;
- a lower head supporting member connected to said main frame and adjacent to said main frame; and
- a lower magnetic head supported by said lower head supporting member;

(v) a disk receiving/ejecting mechanism placed between said main frame and said cover and coupled to said main frame for receiving and ejecting said disk cartridge, wherein said disk receiving/ejecting mechanism comprises:
- an eject plate coupled to said main frame for ejecting said disk cartridge; and
- a disk holder coupled to said eject plate for holding said disk cartridge, and (vi) a reinforcing system coupled to said head assembly for inhibiting an internal collision in said head assembly even when said disk drive is subjected to a mechanical shock, wherein said reinforcing system comprises:
- a butting cart extending from said upper arm of said head assembly towards said cover;
- a supporting part connected to said main frame and standing up towards said cover;
- a standing member connected to said main board and standing up towards said cover; and
- a cut-and-raised part formed on said disk holder and standing up towards said cover.

2. A disk drive according to claim 1, wherein said supporting part is located rearward in an inserting direction of said disk cartridge and faced to one side of said head assembly, wherein said standing member is located rearward in the inserting direction and faced to the other side of said head assembly, and wherein said cut-and-raised part is located frontward in the inserting direction.

3. A disk drive according to claim 1, further comprising a reinforcing system support member connected to said main frame, said supporting part being formed on said support member.

4. A disk drive according to claim 3, further comprising a stepping motor supported by said reinforcing system support member for moving said head assembly in the radial direction, wherein said supporting part supports a rotation shaft of said stepping motor.

* * * * *